Figure 1:
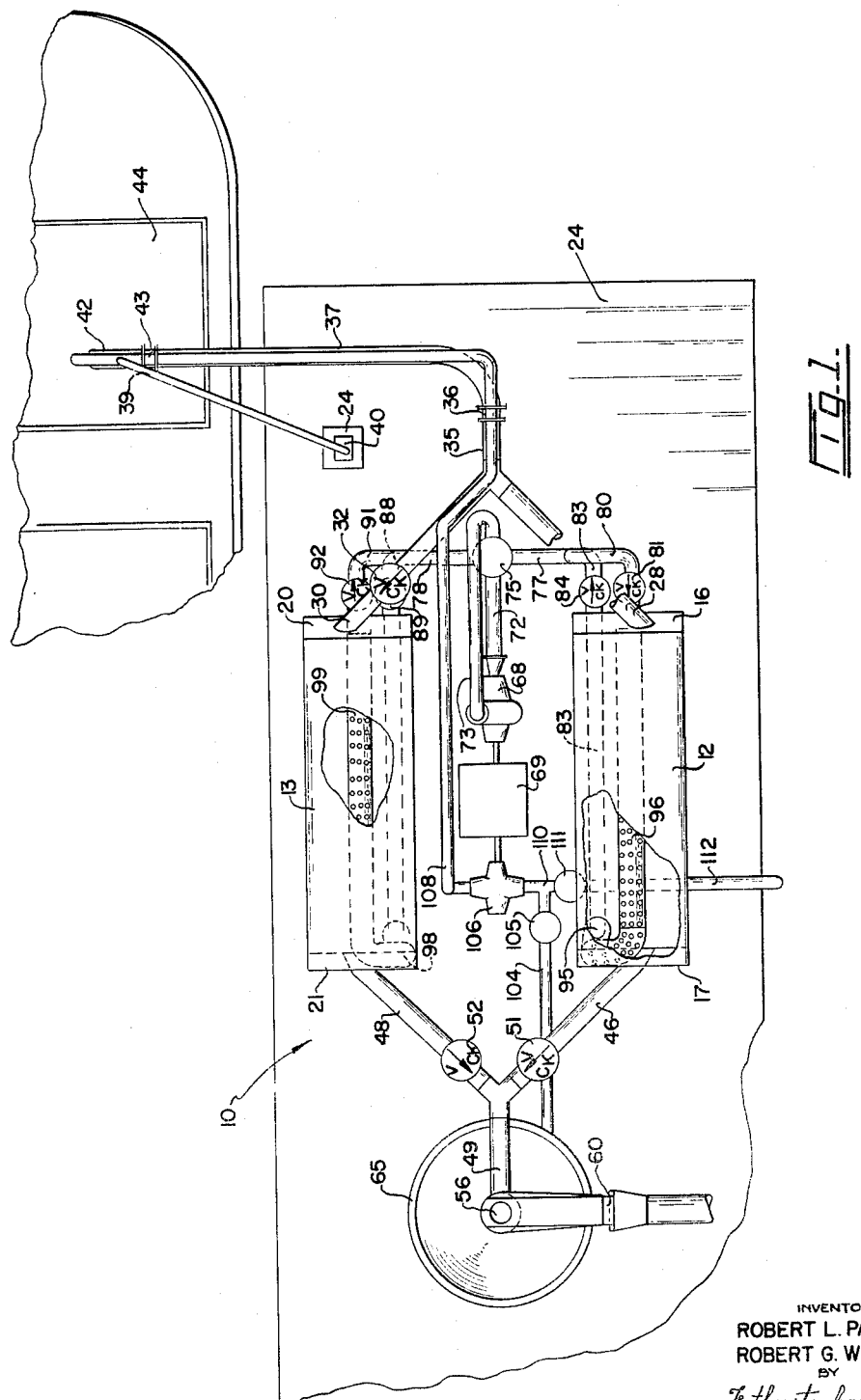

Oct. 19, 1965 R. L. PAYNE ETAL 3,212,822
APPARATUS FOR PUMPING OBJECTS TO HIGHER LEVELS
Filed Aug. 16, 1963 5 Sheets-Sheet 1

INVENTOR
ROBERT L. PAYNE
ROBERT G. WILSON
BY
Fetherstonhaugh & Co.
ATTORNEYS

Oct. 19, 1965 R. L. PAYNE ETAL 3,212,822
APPARATUS FOR PUMPING OBJECTS TO HIGHER LEVELS
Filed Aug. 16, 1963 5 Sheets-Sheet 3

INVENTORS
ROBERT L. PAYNE
ROBERT G. WILSON
BY
Featherstonhaugh & Co.
ATTORNEYS

Oct. 19, 1965   R. L. PAYNE ETAL   3,212,822
APPARATUS FOR PUMPING OBJECTS TO HIGHER LEVELS
Filed Aug. 16, 1963   5 Sheets-Sheet 5

INVENTORS
ROBERT L. PAYNE
ROBERT G. WILSON
BY
Fetherstonhaugh & Co.
ATTORNEYS

United States Patent Office 3,212,822
Patented Oct. 19, 1965

3,212,822
APPARATUS FOR PUMPING OBJECTS TO HIGHER LEVELS
Robert L. Payne, Vancouver, British Columbia, and Robert G. Wilson, Cloverdale, British Columbia, Canada, assignors to J. H. Todd & Sons Ltd., Vancouver, British Columbia, Canada, a corporation of British Columbia
Filed Aug. 16, 1963, Ser. No. 302,652
11 Claims. (Cl. 302—14)

This invention relates to apparatus for pumping objects in water or other liquids to higher levels.

The present apparatus was particularly designed for unloading fish from the holds of fishing boats, but it is to be understood that the apparatus may be used for raising any objects in liquid to higher levels. For the sake of convenience, the apparatus is described herein in connection with the unloading of fish boats.

Fish has been pumped out of the holds of boats in the past, but the fish have travelled through the impellers of the pumps. This is damaging to the fish, and particularly to large fish, such as salmon, and it also has the disadvantage that the pumps have to made large enough to let the fish travel therethrough with as little damage as possible. The enlargement of the pumps affects the efficiency thereof and the power required for operation.

The main object of the present invention is the provision of apparatus for pumping objects, such as fish, in water to a higher level from a holder, such as the hold of a boat, without the objects moving through the impeller of a power-operated pump.

Another object of the present invention is the provision of apparatus for the above-noted purpose which is comparatively simple in construction, and simple and efficient in operation.

Apparatus according to the present invention comprises a container or tank, suction pipe means connected to the container and adapted to direct objects thereto from a holder, a check valve at said suction pipe means for the container opening towards the latter, a power-operated pump, an elevating pipe having a discharge at an upper end thereof, piping means interconnecting the pump, the container and the elevating pipe, and valve means in said piping means operable to cause the pump alternately to suck water out of the container and thereby suck objects through the suction pipe means into said container and to force water into the container to force objects out of said container and up to the elevating pipe and out through the discharge end thereof.

Figure 2:
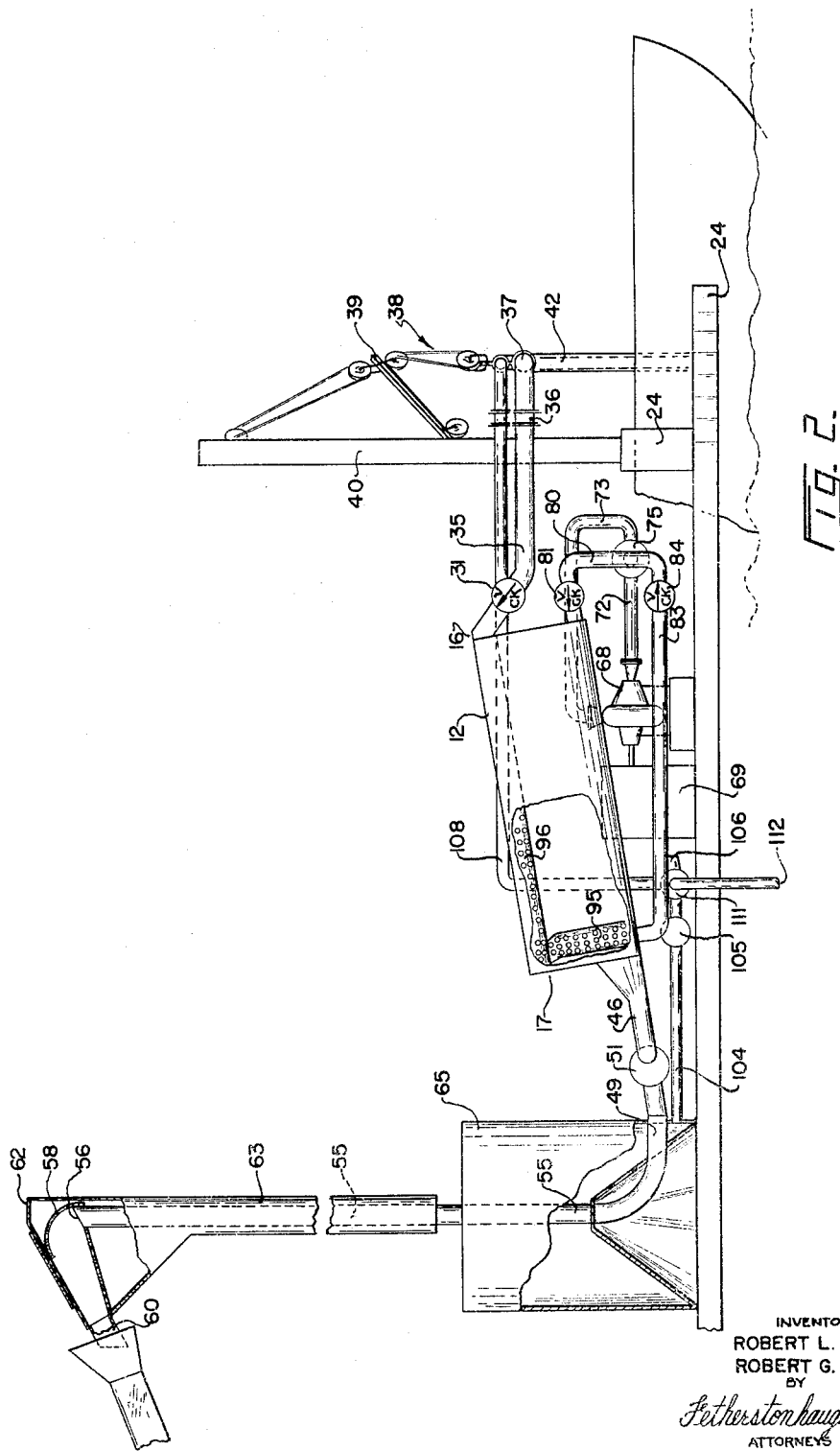
Figure 3:
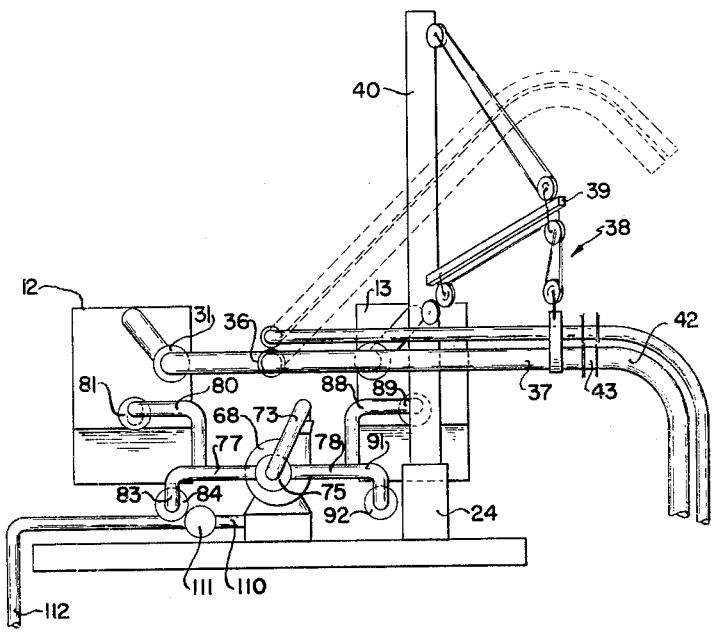
Figure 4:
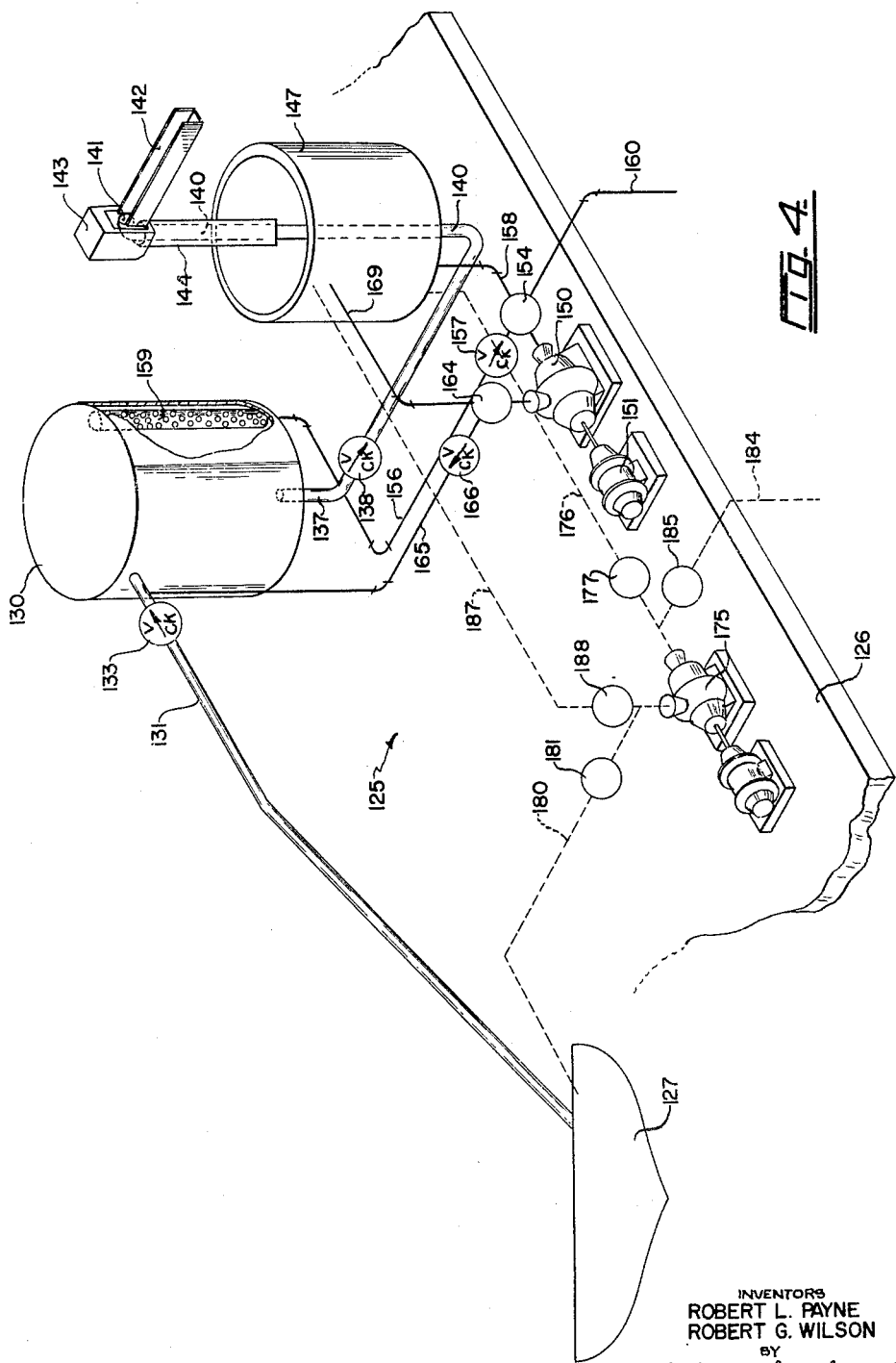
Figure 5:
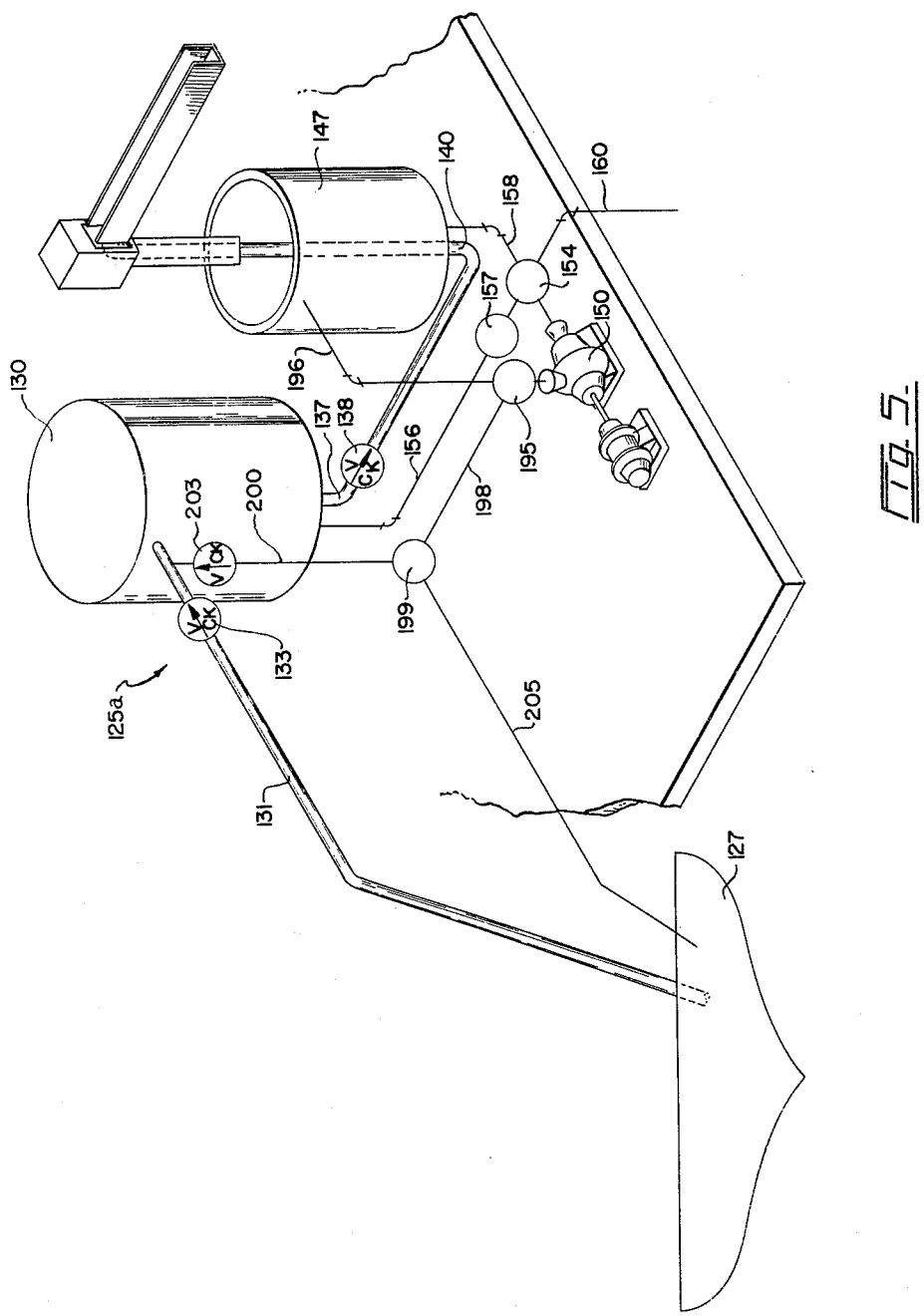

Two preferred forms of the invention are illustrated in the accompanying drawings, in which, FIGURE 1 is a diagrammatic plan view of apparatus for raising fish and other objects to higher elevations, FIGURE 2 is a side elevation of the apparatus of FIGURE 1, FIGURE 3 is an end elevation of the apparatus, FIGURE 4 is a schematic view of an alternative form of object raising apparatus, and FIGURE 5 is a schematic view of an other alternative form of the invention.

Referring to FIGURES 1 to 3 of the drawings, 10 is one form of pumping apparatus which includes substantially parallel containers or tanks 12 and 13 mounted in any suitable manner. Container 12 is preferably inclined, see FIGURE 2, so that it has an upper entrance end 16 and a lower outlet end 17. Container 13 is similarly inclined so that it has an upper entrance end 20 and a lower outlet end 21. Apparatus 10 is mounted on a suitable base 24 which may be a dock or a scow adapted to be moored to a dock.

Suction pipes 28 and 30 having check valves 31 and 32, respectively, therein, open into ends 16 and 20 of containers 12 and 13 near the tops of said containers. Pipes 28 and 30 may be adapted to extend directly to the hold of a fish boat, but in the illustrated form of the invention said pipes 28 and 30 extend to a common pipe 35 having a swivel 36 therein. A common suction pipe 37 extends from swivel 36 and is raised and lowered by block and tackle 38 extending from a boom 39 of a crane 40 mounted on base 24. A flexible pipe 42 is connected by swivel 43 to the outer end of pipe 37, said pipe 42 being adapted to hang down into the hold of a fish boat, indicated at 44. Check valves 31 and 32 open towards containers 12 and 13 so that water may be sucked through the suction pipe into the container but cannot flow in the opposite direction.

Each of the containers or tanks 12 and 13 may have a pipe system extending therefrom to a higher level, but in apparatus 10, a common elevating pipe system is provided for these containers. Outlet pipes 46 and 48 extend from the bottoms of containers 12 and 13 at the outlet ends 17 and 21 thereof to a common outlet pipe 49. Check valves 51 and 52 are provided in pipes 46 and 48, and open away from the containers so that water may flow out of the containers into pipe 49 but not in the opposite direction. Pipe 49 extends to the lower end of an elevating pipe 55 which may be telescopic so that the length thereof may be adjusted to suit different situations. Pipe 55 has a discharge outlet 56 at its outer end. A curved deflector 58 which may be solid but preferably is perforated, curves up and over discharge end 56 to direct water and fish emerging from pipe 55 into a downwardly-inclined chute 60 which discharges the fish from the apparatus. A hood 62 is positioned over the upper end of pipe 55 and most of chute 60, and a pipe 63 extends downwardly from this hood around and spaced from pipe 55. The portion of chute 60 within hood 62 is perforated so that water flowing out through discharge outlet 56 and into the chute passes through the perforated portion of the latter into pipe 63. A receptacle 65 is mounted below pipe 63 to catch the water therefrom. This water may be discharged from the apparatus, but it is preferable to catch it in receptacle 65 for recirculation.

A suitable power-operated pump is provided for apparatus 10. In this example, a centrifugal pump 68 driven by a motor 69 is provided. Suitable pipe means and control valve means are provided for alternately connecting the inlet of pump 68 to container 12 and the outlet of the pump to container 13, and alternately to connect the inlet of the pump to container 13 and the pump outlet to container 12. In this example, pipes 72 and 73 connect the inlet and the outlet of pump 68 to a 4-way control valve 75. Pipes 77 and 78 extend away from valve 75 towards containers 12 and 13. Pipe 77 extends to a branch pipe 80 having a check valve 81 therein and extending into the bottom of container 12 at end 16 thereof, said check valve opening towards the container. Another branch pipe 83 extends from pipe 77 and has a check valve 84 therein, and extends into the bottom of container 12 at end 17 thereof, said check valve opening away from the container. Similarly, pipe 78 extends to a branch pipe 88 having a check valve 89 therein, said branch pipe opening into the bottom of container 13 at end 20 thereof. Valve 89 opens towards container 12. Another branch pipe 91 extends from pipe 78 and has a check valve 92 therein, said pipe 91 opening into the bottom of container 13 near its end 21. Valve 92 opens away from container 13.

Pipe 83 extends away from the lowest portion of container 12. As this container at times is full or nearly full of fish, it is desirable to provide means in the container to enable water to flow into pipe 83 at all times. For this purpose, a perforated tube 95 is provided in container 12, said perforated tube extending from the end of pipe 83 around end 17 of the container to the top thereof, said perforated tube then extending in a section 96 along the top of the container to its upper end 16. Similarly, a perforated tube 98 is provided in container 13 and extends from the end of pipe 91 around the end 21 of the container, and then extends as section 99 along the top of the container to its upper end 20.

A pipe 104 having a control valve 105 therein extends from receptacle 65 to a pump 106 which is driven by motor 69. The outlet of said pump is connected to a pipe 108 which extends into the hold of boat 44 to supply water thereto. Another pipe 110 having a control valve 111 therein is connected to pipe 104 between its valve 105 and pump 106, said pipe 110 being connected to a suction hose 112 through which water may be drawn into the system.

The containers and pipes of apparatus 10 are filled, and water is directed into the hold of boat 44 before the apparatus is set into pumping operation. Valve 75 is set to cause pump 68 to draw water out of container 12 and pump it into container 13. This sucks water and fish out of boat 44 through pipes 37 and 28 into container 12. Then valve 75 is reversed to cause pump 68 to draw water out of container 13 and to pump it into container 12. This sucks water and fish from the boat through pipes 37 and 30 into container 13. At the same time, the water pumped into container 12 forces the fish thereof through pipes 46 and 49 into elevating pipe 55. The water and fish flow out of discharge 56 of the elevating pipe into chute 60. The fish are directed out of the apparatus by the chute, while the water drops down through pipe 63 into receptacle 65 and is directed by pump 106 through pipes 104 and 108 back into boat 44. The next reversal of valve 75 sucks fish again into container 12, while the water pumped out of said container is directed into container 13 to force the fish from the latter container through pipes 48 and 49 into and up elevating pipe 55. These fish are discharged from the apparatus by chute 60 while the water returns through pipe 63 to receptacle 65. Thus, pump 68 pumps water only, while fish are alternately drawn into containers 12 and 13 as water is pumped out of these containers, and the water pumped out of each container is directed into the other one to force the fish therefrom up the elevating pipe.

FIGURE 4 illustrates alternative pumping apparatus 125. This apparatus is mounted on a suitable base 126, such as a dock or scow, and it is adapted to remove fish from the hold of a boat 127.

A closed container or tank 130 is mounted in any suitable manner on base 126, and a suction pipe 131 extends from the container and is adapted to extend into the hold of boat 127. A check valve 133 is mounted in pipe 131 and opens towards container 130. An outlet pipe 137 extends from the bottom of container 130 and has a check valve 138 therein opening away from the container. Pipe 137 extends to the lower end of an elevating pipe 140 having a discharge 141 at its upper end. This discharge opens into a chute 142, and a hood 143 around the upper end of pipe 140 directs water downwardly through a pipe 144 surrounding said elevating pipe 140. A container or receptacle 147 is provided beneath pipe 144 to catch water flowing therefrom.

A pump 150 driven by a motor 151 has its inlet connected to a control valve 154 which may be operated to connect the pump to the bottom of container 130 by a pipe 156 having a check valve 157 therein opening away from the container, or to connect said pump to container 147 by a pipe 158. A perforated tube 159 in container 130 extends from pipe 156 upwardly to near the top of said container. Water can be admitted to the system through pipe 160 which extends to valve 154.

The outlet of pump 150 is connected to a control valve 164 which can be operated to direct water into the top of container 130 through pipe 165 having a check valve 166 therein opening towards said container, or to direct water to container 147 through a pipe 169.

During operation, pump 150 draws water from container 130 and directs it into container 147 in order to suck water and fish from boat 127 through pipe 131 into container 130, and alternately draws water from container 147 and directs it into container 130 to force the fish into and up through elevating pipe 140.

Another pump 175 may be provided to draw water from container 147 through pipe 176 having a control valve 177 therein, and directing it to the hold of boat 127 through a pipe 180 with a control valve 181 therein. If desired, pipe 160 mentioned above may be omitted, in which case water can be drawn into the system by pump 175 through a pipe 184 having a control valve 185. Pump 175 can direct this water to the boat through pipe 180 or to container 147 through a pipe 187 controlled by a valve 188.

FIGURE 5 illustrates an alternative form of pumping apparatus 125a which is slightly different from apparatus 125. Apparatus 125a employs one pump only, namely pump 150, for drawing fish into container 130, forcing them up elevating pipe 140, pumping water into boat 127, and drawing water into the system through pipe 160.

The outlet of pump 150 is connected to control valve 195 which can be operated to direct water through a pipe 196 to container 147, or through a pipe 198, a 2-way valve 199 and a pipe 200 to container 130, said pipe 200 having a check valve 203 therein which opens towards container 130. Valve 199 can be operated to cut off pipe 198 from pipe 200 and to connect said pipe 198 to a pipe 205 which extends into boat 127.

Valves 154 and 195 are operated to cause pump 150 to draw water through pipe 156 from container 130 and to direct said water through pipe 196 into container 147, thereby sucking fish from the boat through pipe 131 into container 130. Then valves 154 and 195 are operated to cause the pump to draw water from container 147 through pipe 158 and to direct said water through pipes 198 and 200 into container 130, thereby forcing the fish through pipe 137 and up pipe 140. When water is needed in boat 127, valve 199 is operated to connect pipe 198 to pipe 205 so that pump 150 directs water from container 147 into the boat.

Alternatively, when pump 150 is sucking fish into container 130, the water pumped from the latter may be directed through pipes 198 and 205 into boat 127 instead of into container 147. Water from container 147 is pumped into container 130 to force the fish up pipe 140.

What we claim as our invention is:

1. Apparatus for pumping objects in water to a higher level from a holder without the objects moving through the impeller of a power-operated pump, comprising a container, suction pipe means connected to the container and adapted to direct objects thereto from said holder, a check valve at said suction pipe means for the container opening towards the latter, a power-operated pump, an elevating pipe having a discharge at an upper end thereof, an outlet pipe connected to the said container at a point lower than the point at which the suction pipe is connected to the container and extending from the container to the elevating pipe, said container defining a downwardly extending flow path for the objects from the suction pipe means to the outlet pipe, a check valve at the outlet pipe for the container and opening away from the latter, piping means interconnecting the pump and container, said piping means including a pump suction pipe and a pump pressure pipe, said pump suction pipe connected to the container at a point substantially adjacent the connection of the said outlet pipe to the container, and said pump pressure pipe connected to the container at a point substantially adjacent the connection of the said suction pipe to the container, and valve means in said piping means operable to cause the pump alternately to first suck water out of the container and thereby suck objects through the suction pipe means into said container and then to force water into said container to force objects out of said container through the outlet pipe to and up the elevating pipe and out through the discharge end thereof.

2. Apparatus as claimed in claim 1 including a second container connected to the inlet and outlet of said pump through the piping means, said valve means being operable alternately to direct water being sucked out of the first-mentioned container into the second container and to direct water from said second container back to said first-mentioned container.

3. Apparatus as claimed in claim 1 including a second container connected to the inlet and outlet of said pump through the piping means, said valve means being operable alternately to direct water being sucked out of the first-mentioned container into the holder and to direct water from said second container back to the first-mentioned container.

4. Apparatus for pumping objects in water to a higher level from a holder without the objects moving through the impeller of a power-operated pump, comprising a first container, suction pipe means extending from said container to said holder, a check valve at said suction pipe means for and opening towards the container, an elevating pipe having a discharge at an upper end, outlet pipe means extending from said container to the elevating pipe, said container defining a downward flow path for the objects from the said suction pipe means to the said outlet pipe means, a check valve in the outlet pipe means for and opening away from the container, a second container, a power-operated pump, a first control valve connected to the inlet of the pump, pipes connecting said control valve to the first and second containers, a check valve in the pipe from the control valve to the first container opening away from said first container, a second control valve connected to the outlet of the pump, pipes connecting said second control valve to the first and second containers, a check valve in the pipe between said second control valve and the first container opening towards the latter, said first and second control valves being operable to cause the pump to suck water out of the first container and to direct it into the second container thereby to suck objects into said first container and alternately to draw water out of the second container and direct it into the first container to force objects out of said first container and up the elevating pipe and out through the discharge end thereof.

5. Apparatus as claimed in claim 4 including a perforated pipe in said first container extending upwardly therein and into which opens the pipe extending from the first control valve to said first container.

6. Apparatus for pumping objects in water to a higher level from a holder without the objects moving through the impeller of a power-operated pump, comprising first and second inclined containers each having an upper end and a lower end, suction pipe means connected to and extending from the upper ends of said containers to said holder, a check valve at said suction pipe means for and opening towards each container, an elevating pipe having a discharge at an upper end, outlet pipe means extending from the lower ends of said containers to the elevating pipe, said containers defining a downwardly inclined flow path for the objects from the suction pipe means to the outlet pipe means, check valves at the outlet pipe means for and opening away from each container, a power-operated pump, distributing pipe means interconnecting the pump and the first and second containers, and directional valve means in said distributing pipe means operable to cause the pump to suck water alternately out of the first and second containers thereby to suck objects from the holder through the suction pipe means respectively into said containers and simultaneously force said water into the second and first containers respectively to force objects out of the containers through the outlet pipe means and up the elevating pipe and out through the discharge end thereof.

7. Apparatus as claimed in claim 6 including a receptacle for receiving water passing through the discharge end of the elevating pipe, return pipe means connecting said receptacle with the first and second containers and including a pipe extending to the holder, and valve means in said return pipe means operable selectively to direct water from the receptacle to the containers and to the holder.

8. Apparatus as claimed in claim 6 including a perforated pipe located in each container and connected to the said distributing pipe means.

9. Apparatus for pumping objects in water to a higher level from a holder without the objects moving through the impeller of a power-operated pump, comprising first and second inclined containers each having an upper end and a lower end, suction pipe means connected to and extending from the upper ends of said containers to said holder, a check valve at said suction pipe means for and opening towards each container, an elevating pipe having a discharge at an upper end, outlet pipe means extending from the lower ends of said containers to the elevating pipe, said containers defining a downwardly inclined flow path for the objects from the suction pipe means to the outlet pipe means, check valves at the outlet pipe means for and opening away from each container, a power-operated pump, inlet pipe means connecting the inlet of the pump to each container outlet pipe means connecting the outlet of the pump to each container, and directional valve means controlling both the inlet pipe means and the outlet pipe means and operable to cause the pump to suck water alternately out of the first and second containers thereby to suck objects from the holder through the suction pipe means respectively into said containers and simultaneously force said water into the second and first containers respectively to force objects out of the containers through the outlet pipe means and up the elevating pipe and out through the discharge end thereof.

10. Apparatus as claimed in claim 9 including a perforated pipe in each container extending from the connection of the said inlet pipe means to said each container into the said containers.

11. Apparatus as claimed in claim 10 including another perforated pipe in each container connected to one end of the first mentioned perforated pipe and extending from the said lower end of each said container to the said upper end thereof.

References Cited by the Examiner

UNITED STATES PATENTS

| | | | |
|---|---|---|---|
| 739,150 | 9/03 | Canon | 103—235 |
| 2,672,370 | 3/54 | Jones | 302—14 |
| 2,672,371 | 3/54 | Jones | 302—14 |
| 2,672,372 | 3/54 | Jones | 302—14 |
| 2,736,121 | 2/56 | Kimmerle | 302—14 |

FOREIGN PATENTS 443,916   9/27   Germany.

SAMUEL F. COLEMAN, *Primary Examiner.*

ANDRES H. NIELSEN, *Examiner.*